United States Patent [19]
Danchick et al.

[11] Patent Number: 5,798,942
[45] Date of Patent: Aug. 25, 1998

[54] N-BEST FEASIBLE HYPOTHESES MULTITARGET TRACKING SYSTEM FOR SPACE-BASED EARLY WARNING SYSTEMS

[75] Inventors: Roy Danchick, Los Angeles; George E. Newnam, Fountain Valley; Jack E. Brooks, Los Angeles, all of Calif.

[73] Assignee: TRW Inc., Redondo Beach, Calif.

[21] Appl. No.: 224,024

[22] Filed: Apr. 5, 1994

[51] Int. Cl.$^6$ ............................................. G01S 13/00
[52] U.S. Cl. .......................... 364/516; 342/90; 342/4; 342/96
[58] Field of Search ................. 364/516; 342/90, 342/94, 96

[56] References Cited

U.S. PATENT DOCUMENTS

| | | | |
|---|---|---|---|
| 4,179,696 | 12/1979 | Quesinberry et al. | 343/7.4 |
| 5,138,321 | 8/1992 | Hammer | 342/36 |
| 5,162,802 | 11/1992 | Zuniga et al. | 342/96 |
| 5,192,955 | 3/1993 | Hoang | 342/80 |
| 5,202,691 | 4/1993 | Hicks | 342/90 |
| 5,325,098 | 6/1994 | Blair et al. | 342/95 |
| 5,379,044 | 1/1995 | Carlson et al. | 342/90 |
| 5,390,133 | 2/1995 | Sohie | 364/516 |
| 5,396,252 | 3/1995 | Kelly | 342/94 |
| 5,400,264 | 3/1995 | Phillis et al. | 364/516 |
| 5,406,289 | 4/1995 | Barker et al. | 342/96 |
| 5,414,643 | 5/1995 | Blackman et al. | 364/516 |

OTHER PUBLICATIONS

Danchick et al., "A Fast Method for Finding the Exact N-Best Hypotheses for Multitarget Tracking", Apr. 1993.

Roy Danchick et al., "Algorithm Architecture Design Principles," Third International Software for Strategic Systems Conference Proceedings, Feb. 27–28, 1990, pp. 86–93.

*Primary Examiner*—Emanuel T. Voeltz
*Assistant Examiner*—Patrick J. Assouad
*Attorney, Agent, or Firm*—Robert W. Keller; Noel F. Heal

[57] ABSTRACT

An N-best feasible hypotheses multitarget tracking system for accurately detecting and tracking large numbers of closely spaced objects in a dense target environment in real time. The multitarget tracking system includes a two-dimensional focal-plane multitarget tracker for performing accurate single-sensor target track assembly of individual target data by directly generating N-best feasible hypotheses, a target typer for performing target typing and providing an initial estimate of each target's launch parameters, a launch parameter estimator for generating a target launch state vector and state error covariance matrix for each target from the assembled target track data, an optimal target data associator for performing multisensor state-to-state association of the target launch states, an optimal target data combiner for performing multisensor state-to-state fusion of the target launch states, a target state initializer for initializing an inertial target state vector and state error covariance matrix, and a target state estimator for recursively updating the inertial target track state vector and state error covariance matrix for each target.

35 Claims, 5 Drawing Sheets

N-BEST FEASIBLE HYPOTHESES MULTITARGET TRACKING SYSTEM FOR SPACE-BASED EARLY WARNING SYSTEMS

BACKGROUND OF THE INVENTION

This invention relates generally to space-based early warning systems and, more particularly, to multitarget tracking systems for detecting and tracking multiple ballistic missile targets.

Space-based early warning systems are being developed to provide early warning of ballistic missile launches by detecting and tracking the hot exhaust plumes of the missiles using infrared sensors. These early warning systems will require multitarget tracking systems that are able to process infrared sensor data and provide accurate detection and tracking of closely spaced objects in a dense multitarget environment. Closely spaced objects are targets whose focal-plane image centers fall within a small number of pixels of each other, and are particularly difficult to accurately detect and track because of the difficulty of associating new observations to existing target tracks in a multitrack environment.

Multitarget tracking systems presently under consideration for use in these space-based early warning systems either cannot accurately associate and track closely spaced objects or require an excessive amount of computer memory and processing time. Multiple hypotheses tracking, an example of the latter, is theoretically the best approach for multitarget tracking.

Multiple hypotheses tracking (MHT) originated with a batch 0–1 integer linear programming approach by C. L. Morefield, which was later modified by D. B. Reid for real-time applications using a sequential implementation. The Reid multiple hypotheses tracking technique introduced the use of clusters for partitioning the global multitarget tracking problem into smaller disjoint local subproblems and the use of tentative and confirmed target tracks. The Reid tracking technique sequentially generates all cluster-specific hypotheses and their associated probabilities and then pares them down by thresholding the probabilities. However, hundreds of thousands of hypotheses are generated for even relatively small clusters of four to five tracks or observations over several sensor scans, making the Reid multiple hypotheses tracking technique impractical to implement.

The Reid multiple hypotheses tracking technique was modified by Nagarajan, Chidambara and Sharma to operate with only N hypotheses of the highest probability for each cluster. The Nagarajan et al. multiple hypotheses tracking technique eliminates the distinction between new observations and noise, thus generating the N-best hypotheses without first generating all of the cluster-associated hypotheses. However, the Nagarajan et al. tracking technique generates nonfeasible hypotheses, which are used to recursively compute each of several feasible hypotheses. A feasible hypothesis results when there is only one measurement for a target or the measurement becomes a new target, whereas a nonfeasible hypothesis results when there is a measurement that can be claimed by two targets or two measurements that can be claimed by the same target. The growth of these nonfeasible hypotheses is combinatorial, meaning these hypotheses must be carried forward during further processing, which requires enormous amounts of computer processing time and memory. Therefore, the Nagarajan et al. tracking technique is impractical to implement for associated probability matrices with dimensions greater than about 6×6. Accordingly, there has been a need for a multiple hypotheses tracking technique that does not require enormous amounts of computer processing time and memory. The present invention clearly fulfills this need.

SUMMARY OF THE INVENTION

The present invention resides in an N-best feasible hypotheses multitarget tracking system for accurately detecting and tracking large numbers of closely spaced objects in a dense target environment in real time. The multitarget tracking system includes a two-dimensional focal-plane multitarget tracker for performing accurate single-sensor target track assembly of individual target data by directly generating N-best feasible hypotheses, a target typer for performing target typing and providing an initial estimate of each target's launch parameters, a launch parameter estimator for generating a target launch state vector and state error covariance matrix for each target from the assembled target track data, an optimal target data associator for performing multisensor state-to-state association of the target launch states, an optimal target data combiner for performing multisensor state-to-state fusion of the target launch states, a target state initializer for initializing an inertial target state vector and state error covariance matrix, and a target state estimator for recursively updating the inertial target track state vector and state error covariance matrix for each target.

The multitarget tracking system, which is preferably onboard an early warning system satellite, receives infrared sensor data from an onboard infrared sensor. The sensor data includes target intensity and line-of-sight measurements in azimuth and elevation. The multitarget tracker uses the infrared sensor data to initiate a two-dimensional focal-plane target track and perform scan-to-scan association of new observations to existing target tracks. After a track has sufficient measurements, the target typer determines the type of target and generates an initial estimate of the target's launch position, launch direction, launch time, and pitchover angle using the assembled track data from the single infrared sensor. The target typer compares observed intensity measurements to intensity values based on database profiles to determine the type of target. Candidate types are eliminated based on a Chi-squared threshold test. Further scans of the single sensor data are processed prior to the launch parameter estimator generating a target launch state vector and state error covariance matrix from the assembled track data.

A second multitarget tracking system, which is preferably onboard another early warning system satellite, receives infrared sensor data from its onboard infrared sensor. The launch parameter estimator onboard the second satellite generates a target launch state vector and state error covariance matrix from the assembled track data from its infrared sensor, which is then supplied to the optimal target data associator onboard the first satellite.

The optimal associator identifies which target launch locations are in a common field of view between the two satellites and compares a number of target launch states from the launch parameter estimator onboard the first satellite with a number of target launch states from the launch parameter estimator onboard the second satellite. The target launch states are compared by state-to-state association, which is performed by solving a conventional linear assignment problem. The state-to-state association of target launch states produces a set of optimally matched pairs of target states and error covariance matrices and a set of unmatched target states and covariance matrices. The first member of each matched pair of target states is from the infrared sensor onboard the first satellite and the second member is from the infrared sensor onboard the second satellite. The unmatched target states are from either infrared sensor and are not in the common field of view.

The optimal target data combiner receives the matched and unmatched target states and state error covariance matrices and optimally combines the target states and error covariance matrices of each matched pair into one state vector and its associated state error covariance matrix. The optimal combiner does not process, but merely passes on, the target states and error covariance matrices of the unmatched target states.

The target state initializer then initializes an inertial stereo target state vector and state error covariance matrix for the matched targets and an inertial mono target state vector and error covariance matrix for the unmatched targets from either sensor. The target state estimator is initialized by the target state vector and error covariance matrix generated by the state initializer, but after initialization, the estimator recursively updates the target state vector and state error covariance matrix from either stereo interleaved or mono line-of-sight data supplied directly by the target trackers. Inertial state initialization is only performed for new targets that enter the field of view of either sensor.

It will be appreciated from the foregoing that the present invention represents a significant advance in the field of multitarget tracking systems. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENTS

Figure 1:
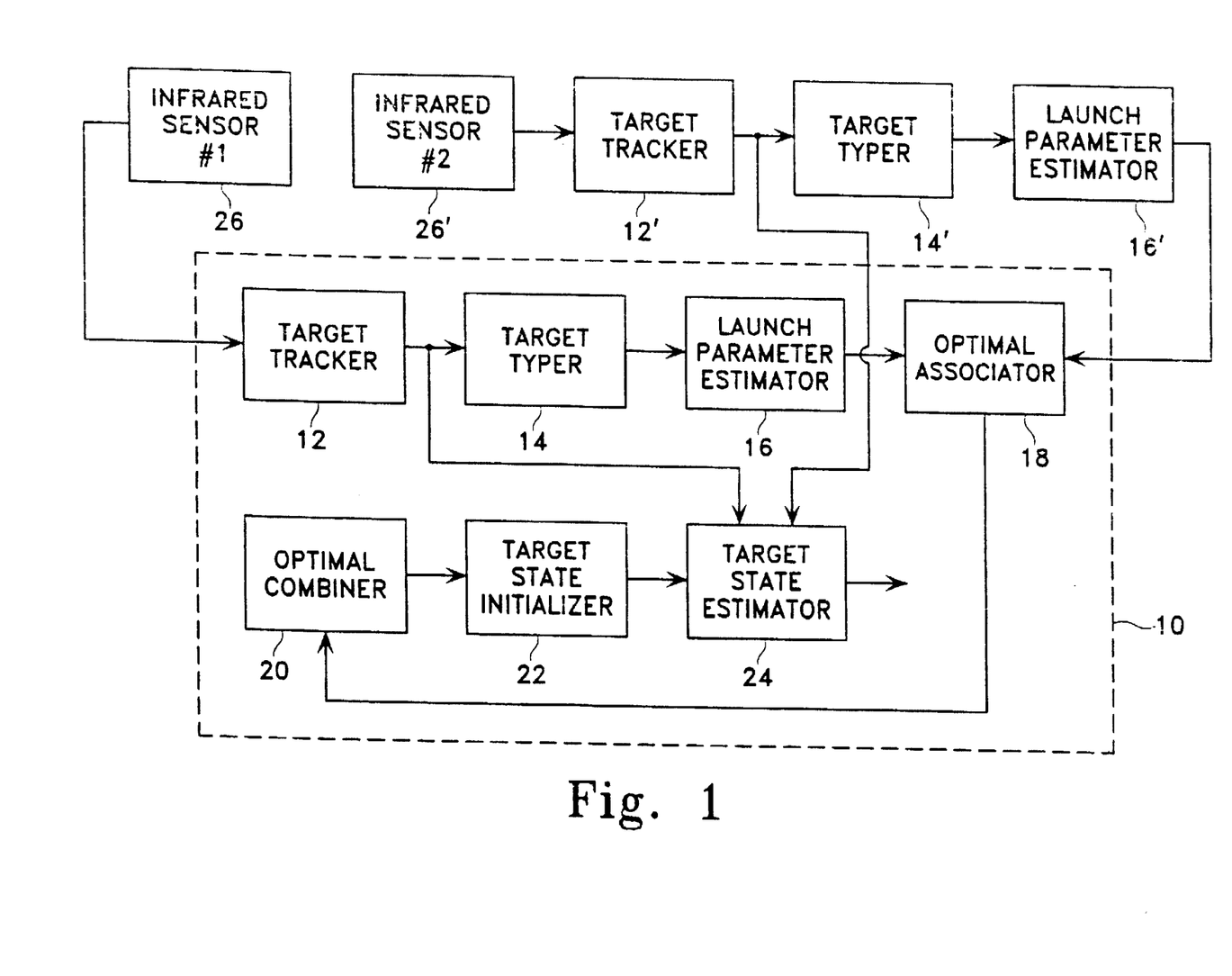
FIG. 1 is a block diagram of an N-best hypotheses multitarget tracking system in accordance with the present invention.

As shown in the drawings for purposes of illustration, the present invention is embodied in an N-best feasible hypotheses multitarget tracking system for accurately detecting and tracking large numbers of closely spaced objects in a dense target environment in real time. As shown in FIG. 1, a multitarget tracking system 10 in accordance with the present invention includes a two-dimensional focal-plane multitarget tracker 12 for performing accurate single-sensor target track assembly of individual target data by directly generating N-best feasible hypotheses, a target typer 14 for performing target typing and providing an initial estimate of each target's launch parameters, a launch parameter estimator 16 for generating a target launch state vector and state error covariance matrix for each target from the assembled target track data, an optimal target data associator 18 for performing multisensor state-to-state association of the target launch states, an optimal target data combiner 20 for performing multisensor state-to-state fusion of the target launch states, a target state initializer 22 for initializing an inertial target state vector and state error covariance matrix, and a target state estimator 24 for recursively updating the inertial target track state vector and state error covariance matrix for each target.

The multitarget tracking system 10, which is preferably onboard an early warning system satellite, receives infrared sensor data from an onboard infrared sensor 26. The sensor data includes target intensity and line-of-sight measurements in azimuth and elevation. The multitarget tracker 12 uses the infrared sensor data to initiate a two-dimensional focal-plane target track and perform scan-to-scan association of new observations to existing target tracks. After a track has sufficient measurements, the target typer 14 determines the type of target and generates an initial estimate of the target's launch position, launch direction, launch time, and pitch-over angle using the assembled track data from the single infrared sensor 26. The target typer 14 compares observed intensity measurements to intensity values based on database profiles to determine the type of target. Candidate types are eliminated based on a Chi-squared threshold test. Further scans of the single sensor data are processed prior to the launch parameter estimator 16 generating a target launch state vector and state error covariance matrix from the assembled track data.

A second multitarget tracking system, which is preferably onboard another early warning system satellite, receives infrared sensor data from an onboard infrared sensor 26'. A target tracker 12', target typer 14' and launch parameter estimator 16' from the second multitarget tracking system are shown in FIG. 1. However, the entire multitarget tracking system 10 is preferably onboard each early warning system satellite in the constellation. The launch parameter estimator 16' generates a target launch state vector and state error covariance matrix from the assembled track data from infrared sensor 26', which is then supplied to the optimal target data associator 18 onboard the first satellite. Although the multitarget tracking systems are preferably placed onboard the early warning system satellites, one or both of the multitarget tracking systems can be based at the ground station of the early warning system, only the infrared sensors 26, 26' actually need to be placed in orbit.

The optimal associator 18 identifies which target launch locations are in a common field of view between the two satellites and compares a number of target launch states from the launch parameter estimator 16 onboard the first satellite with a number of target-launch states from the launch parameter estimator 16' onboard the second satellite. The target launch states are compared by state-to-state association, which is performed by solving a conventional linear assignment problem. The state-to-state association of target launch states produces a set of optimally matched pairs of target states and error covariance matrices and a set of unmatched target states and covariance matrices. The first member of each matched pair of target states is from infrared sensor 26 and the second member is from infrared sensor 26'. The unmatched target states are from either infrared sensor and are not in the common field of view.

The optimal target data combiner 20 receives the matched and unmatched target states and state error covariance matrices and optimally combines the target states and error covariance matrices of each matched pair into one state vector and its associated state error covariance matrix. The optimal combiner 20 does not process, but merely passes on, the target states and error covariance matrices of the unmatched target states.

The target state initializer 22 then initializes an inertial stereo target state vector and state error covariance matrix for the matched targets and an inertial mono target state vector and error covariance matrix for the unmatched targets from either sensor. The target state estimator 24 is initialized by the target state vector and error covariance matrix generated by the state initializer 22, but after initialization, the estimator 24 recursively updates the target state vector and state error covariance matrix from either stereo interleaved or mono line-of-sight data supplied directly by the target trackers 12, 12'. Inertial state initialization is only performed for new targets that enter the field of view of either sensor 26, 26'.

TWO-DIMENSIONAL FOCAL-PLANE MULTITARGET TRACKER

The function of the two-dimensional focal-plane multitarget tracker 12 is to perform two-dimensional focal-plane kinematic track assembly by associating new observations to existing target tracks recursively from one scan to the next. The multitarget tracker 12 employs an N-best feasible hypotheses tracking technique in which the N-best feasible hypotheses of track-to-measurement assignments are generated directly using a non-combinatorial technique from a linear assignment problem solution to negative-log-likelihood matrices of track-to-measurement assignments. A hypothesis corresponds to a possible allocation of new observations to existing tracks and has an associated recursively-computed probability. This technique uses only feasible hypotheses and, therefore, is practical and operationally implementable.

Track assembly is accomplished as follows:

1) Convert sensor line-of-sight (LOS) measurements in azimuth and elevation (az LOS $\triangle$, el LOS $\triangle$) into two-dimensional stabilized focal-plane coordinates (x,y).

2) Partition the sensor field-of-view into clusters of observations. Each cluster is assigned a constant, specified number of hypotheses.

3) Initiate tracks on new, unassigned observations and assign the new tracks to existing clusters.

4) Propagate existing target tracks forward to measurement times.

5) Set gates about predicted target positions.

6) Construct a negative-log-likelihood matrix of track-to-measurement assignments for each cluster.

7) Generate directly and non-combinatorially the N-best feasible hypotheses of track-to-measurement assignments from a linear assignment problem solution to the negative-log-likelihood matrices of track-to-measurement assignments.

8) Update the focal-plane target track state vectors and state error covariance matrices with the assigned measurements for each cluster for each of the N-best hypotheses using sets of decoupled Kalman filters, thereby generating assembled, identification-tagged target tracks of measurements.

These functions are performed recursively from one scan to the next. The sensor measurements also include target intensity and time of the observation. For a staring infrared sensor, the time of each observation is common for all sensor measurements in each frame, while for a scanning sensor, the time of each observation varies with the scan angle of the sensor.

The sensor line-of-sight (LOS) measurements in azimuth and elevation (az LOS $\triangle$, el LOS $\triangle$) are converted into two-dimensional stabilized focal-plane coordinates (x,y) as follows:

$u_x = \cos(el\ LOS\ \triangle) \cos(az\ LOS\ \triangle)$ $u_y = \cos(el\ LOS\ \triangle) \sin(az\ LOS\ \triangle)$ $u_z = \sin(el\ LOS\ \triangle)$ $$x = -\frac{Fu_x}{u_z}, \quad y = -\frac{Fu_y}{u_z},$$

where F is the focal length.

Figure 2:
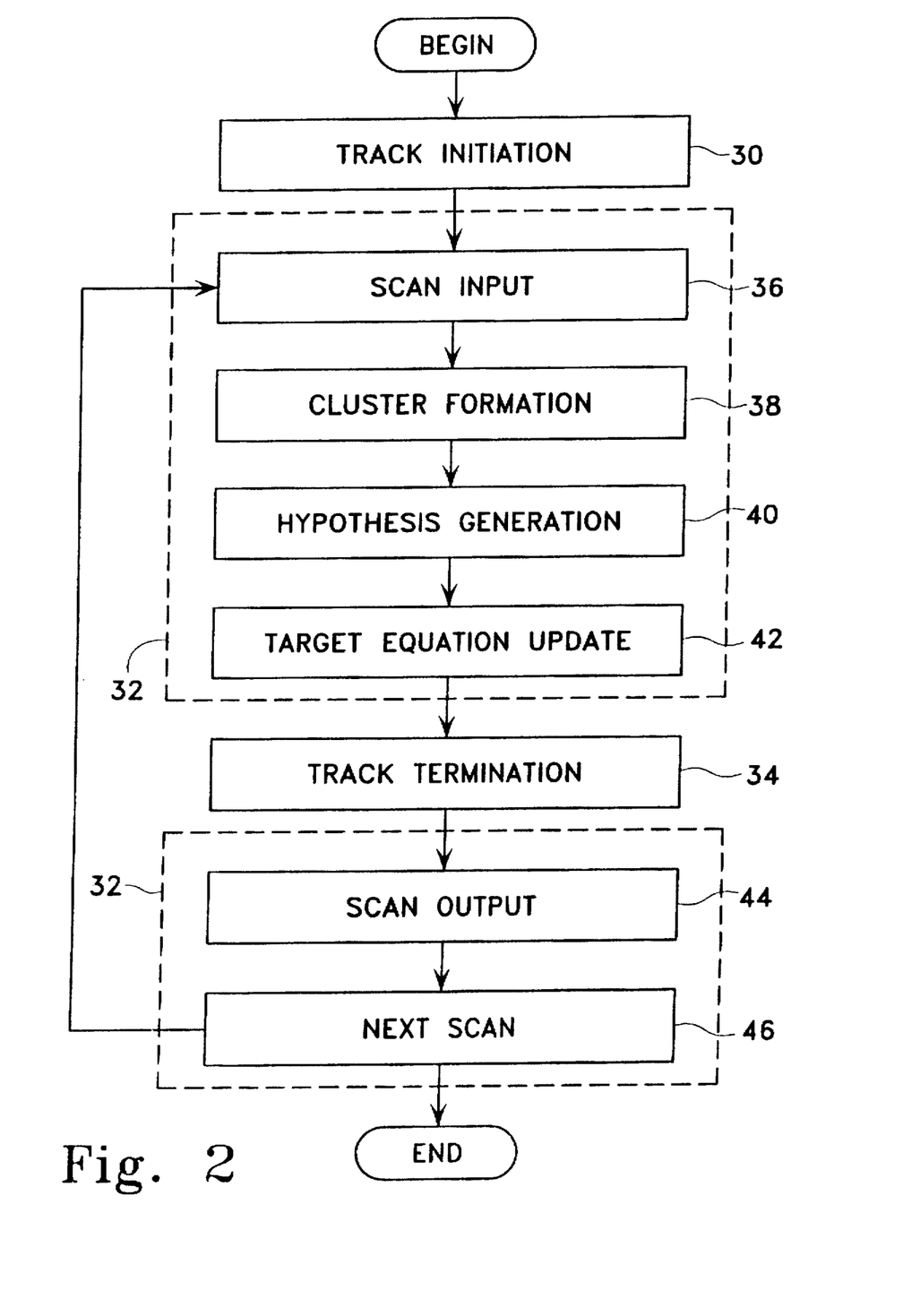
FIG. 2 is a flow chart of a two-dimensional focal-plane multitarget tracker for the multitarget tracking system of the present invention.

As shown in FIG. 2, the multitarget tracker 12 includes a track initiation function 30, a track maintenance function 32 and a track termination function 34. The track maintenance function 32 includes a scan input function 36, a cluster formation function 38, a hypothesis generation function 40, a target state update function 42, a scan output function 44, and a next scan function 46.

Track Initiation

The track initiation function 30 provides initialization of a stabilized focal-plane coordinate system cluster and cluster-specific track for each new, unassigned observation and establishes a single hypothesis for each cluster. The track initiation function 30 initializes the focal plane x and y track state vectors, the x and y covariance matrices and other track status data. Inputs for track initiation are:

1) Current frame number
2) Frame time
3) Number of detections in the frame for each detector For each detection 4) Observation ID
5) Stabilized focal plane x-coordinate (x)
6) Stabilized focal plane y-coordinate (y)
7) Radiometric measurements #1 through N
8) x-sigma
9) y-sigma
10) Radiometric measurement sigmas #1 through N.

For each detection (x,y), the track state vectors and state error covariance matrices are initialized to the single hypothesis state vectors $x_0$ and $y_0$ and covariance matrix lower triangular factors $L_{x,0}$ and $L_{y,0}$ as follows:

$x_0 = [x, 0, 0]^T$ $L_{x,0} = \text{diag}[\sigma_x, \sigma_{\dot{x}}, \sigma_{\ddot{x}}]$ $y_0 = [y, 0, 0]^T$ $L_{y,0} = \text{diag}[\sigma_y, \sigma_{\dot{y}}, \sigma_{\ddot{y}}]$, where $\sigma_x$ and $\sigma_y$ are detection inputs and $\sigma_{\dot{x}}, \sigma_{\ddot{x}}, \sigma_{\dot{y}}$, and $\sigma_{\ddot{y}}$ are computed from off-line ensemble averaging over the engagement geometries. Initial hypothesis probability is set to 1.0.

In addition to the track state vector and state error covariance matrices, the following parameters are generated for each initiating detection:

1) Cluster sequence number
2) Cluster detection list containing the ID of the initiating observation
3) Cluster detection list for the initiating observation containing the cluster sequence number
4) Cluster hypothesis matrix (1×1) with the (1,1) entry containing the ID of the initiating observation. Row index 1 refers to the single hypothesis and column index 1 refers to the single entry of the cluster detection list.

Figure 3A:
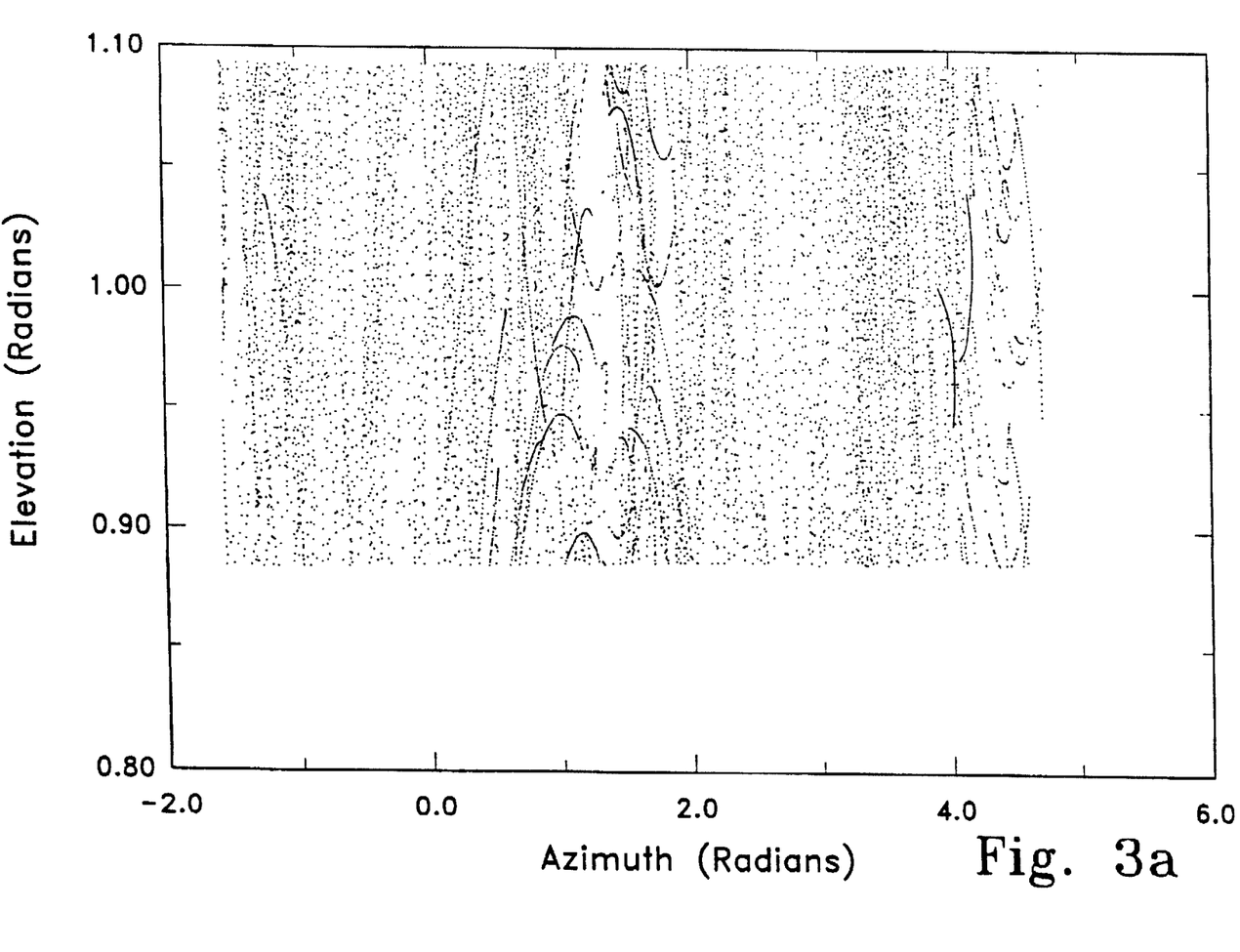
FIGS. 3a and 3b illustrate the effect of converting sensor line-of-sight (LOS) measurements in azimuth and elevation (FIG. 3a) into two-dimensional stabilized focal-plane coordinates (FIG. 3b) for 3000 resident space objects.
Figure 3B:
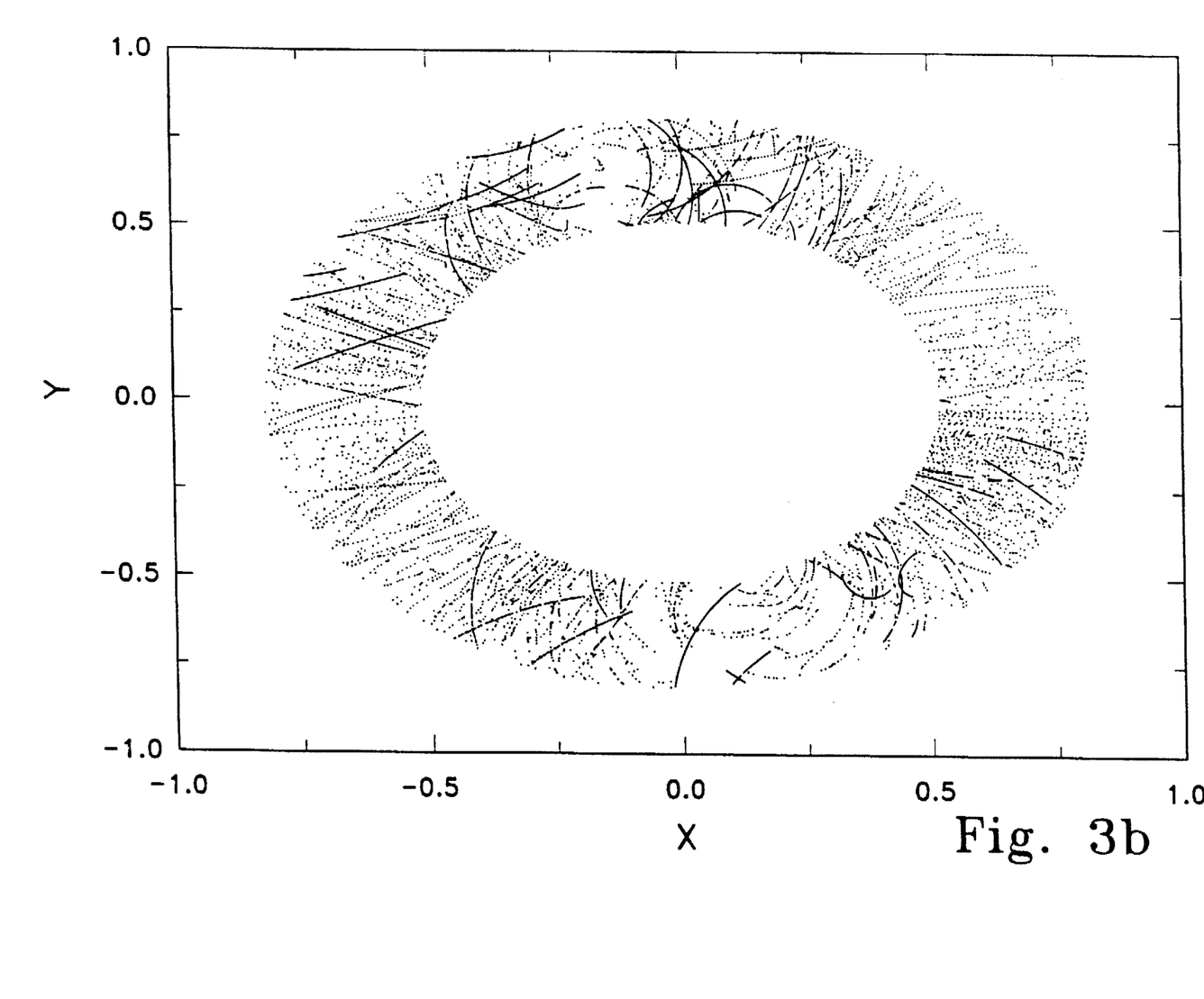

The advantages of using stabilized focal-plane coordinates instead of azimuth and elevation coordinates is shown in FIGS. 3a and 3b for 3000 resident space objects. The use of stabilized focal-plane coordinates transforms the target tracks into individually-identifiable straight lines or arcs that can be modeled using quadratic polynomials. The coefficients of the quadratic polynomials are recursively updated using two decoupled three-state filters. One set of states is x, $\dot{x}$, and $\ddot{x}$ and the other set of states is y, $\dot{y}$, and $\ddot{y}$.

Track Maintenance

The track maintenance function 32 includes the scan input function 36, the cluster formation function 38, the hypothesis generation function 40, the target state update function 42, the scan output function 44 and the next scan function 46.

Scan Input - The scan input function 36 has the same inputs as the track initiation function 30. The scan input function 36 inputs one frame of observation data into the other tracker functions. Data include line-of-sight (x,y) coordinates, radiometric measurements, and estimates of the measurement uncertainties, including individual line-of-sight (LOS) coordinate measurement sigmas and radiometric measurement sigmas.

Cluster Formation - The cluster formation function 38 performs gate matching and handles observations based on whether or not the observations fall within the gates of a previous cluster. The cluster formation function 38 also determines which measurements fall within the gates centered about cluster-specific track state predictions in the stabilized coordinate frame. The cluster formation function searches over each existing cluster, each new observation within the frame, and each existing hypothesis-related target track for each hypothesis carried by the cluster. For each observation in the frame, the cluster formation function 38 generates a list of which clusters include the observation in the gate for some target track corresponding to some hypothesis related to the cluster. For each cluster, the cluster formation function 38 generates a list of which new observations in the frame are linked to the cluster by the gate inclusion.

Each observation in the frame is designated as either a matched detection or an unmatched detection. A matched detection is a detection having an ID that appears in some cluster detection list, while an unmatched detection is a detection having an ID that does not. Each matched detection maintains a corresponding list of all clusters that contain the particular detection. If more than one cluster contains the detection, the clusters containing the detection are combined into a super cluster. The cluster formation function 38 terminates with a set of disjoint clusters and a master list of detections that fall within the cluster gates. Each cluster has a corresponding integer-valued hypothesis matrix.

Each hypothesis matrix includes a row for each hypothesis and a column for each detection. The integer value in matrix entry (i,j) contains the hypothesized originating detection ID for the measurement ID corresponding to the $j^{th}$ column and $i^{th}$ hypothesis. A single hypothesis matrix per cluster is maintained. The hypothesis matrix provides a complete unambiguous picture of how every detection contained in the cluster is associated with a detection in the previous frame, or is the initiating detection of a new track. The unmatched detections each initiate their own clusters.

The cluster formation function 38 includes a find gate match function and a handle matched detection function.

The gate match function performs state propagation to determine if the detection is inside the gate of the track. For each cluster, each cluster hypothesis, each n+1 frame stabilized focal-plane coordinate observation pair (x,y), and for each n scan hypothesis state vectors $x_n$, $y_n$:

$$\underline{x}_{n+1} = \Phi(n+1,n)\underline{x}_n = |x_{n+1}, \dot{x}_{n+1}, \ddot{x}_{n+1}|^T$$

$$P_{x,n+1} = |\Phi(n+1,n)L_{x,n}||\Phi(n+1,n)L_{x,n}|^T + \Gamma_{x,n+1}$$

$$R_x = P_{x,n+1}(1,1) + \sigma_x^2$$

$$\underline{y}_{n+1} = \Phi(n+1,n)\underline{y}_n = |y_{n+1}, \dot{y}_{n+1}, \ddot{y}_{n+1}|^T$$

$$P_{y,n+1} = |\Phi(n+1,n)L_{y,n}||\Phi(n+1,n)L_{y,n}|^T + \Gamma_{y,n+1}$$

$$R_y = P_{y,n+1}(1,1) + \sigma_y^2,$$

where $\Phi(n+1,n)$ is the state transition matrix:

$$\Phi(n+1, n) = \begin{bmatrix} 1 & \Delta t_{n+1} & \frac{\Delta t_{n+1}^2}{2} \\ 0 & 1 & \Delta t_{n+1} \\ 0 & 0 & 1 \end{bmatrix},$$

$x_{n+1}$ and $y_{n+1}$ are the predicted x and y state vectors, $P_{x,n+1}$ and $P_{y,n+1}$ are the predicted state covariance matrices for the x and y states, $L_{x,n}$ and $L_{y,n}$ are the covariance matrix lower triangular factors, $\Gamma_{x,n+1}$ and $\Gamma_{y,n+1}$ are computed from off-line processing of the ensemble of engagement geometries, $R_x$ and $R_y$ are the variance residuals, $P_{x,n+1}(1,1)$ and $P_{y,n+1}(1,1)$ are the variances of the predictions, $\sigma_x^2$ and $\sigma_y^2$ are the variances of the observations, and $\Delta t_{n+1} = t_{n+1} - t_n$.

If $|x-x_{n+1}| < \eta\sqrt{R_x}$ and $|y-y_{n+1}| < \eta\sqrt{R_y}$, where $\eta$ is a gate constant, then (x,y) is in the gate of the track and the cluster detection list is incremented to contain the ID of (x,y), and the cluster detection list of (x,y) is incremented to contain the sequence number of the cluster. Otherwise, the next cluster hypothesis track state vectors are processed.

In the handle matched detection function, for each disjoint cluster, for each hypothesis h related to the cluster, let P(n,h) be the hypothesis probability, which is normalized by setting P(n,h) → P(n,h)/P, where $$P = \sum_h (n, h).$$

Hylpothesis Generation - The hypothesis generation function 40 computes a matrix of negative-log-likelihoods of observations to existing tracks. Then the hypothesis generation function finds the optimal assignment of observations to tracks, the next optimal assignment of observations to tracks, and so forth. This generates the N-best feasible hypotheses without generating all of the hypotheses. There is no distinction between noise and a new target. The noise tracks are carried forward and eliminated by the track termination function 34.

The N-best feasible hypotheses tracking technique includes an initialization function and a sequence of sweeps. The N-best feasible hypotheses tracking technique operates as follows. First, the unconstrained solution to the linear assignment problem is found in which all of the matrix entries can participate. At the first sweep, a set of assignments is computed, each of which excludes just one of the entries found in the optimal solution. Neglecting duplicate assignments, the second best (next smallest to the unconstrained optimal assignment) must appear in this set. After eliminating duplicate solutions, sorting, and retaining all of the assignments of the set in ascending order of their values, a set of excluded doubletons is formed. These are pairs of matrix entries in which the first matrix entry comes from the set of singletons in the optimal assignment and the second entry comes from assignments generated from the first sweep that were added to the retained assignment list. At the second sweep, a set of linear assignment problem solutions that excludes each of these pairs is computed. These are again sorted and merged into the retained assignment list. The third best assignment must appear in this set. Then sets of excluded tripletons, excluded quadruples, and excluded n-tuples are formed until a sweep is reached in which none of the linear assignment problem solutions have a value smaller than the Nth best solution already contained in the list.

The probability of hypothesis $P_i^k$ is defined as:

$$P_i^k = P(\Omega_g^{k-1}) \prod_{m=1}^{q} \beta(m, j_h, \Omega_g^{k-1}),$$

where $P(\Omega_g^{k-1})$ is the probability of the past scan hypothesis $\Omega_g^{k-1}$ being retained after processing $k-1$ scan measurements, $\beta(m, j_h, \Omega_g^{k-1})$ is the probability that measurement m corresponds to target $j_h$, and q is the number of measurements in the multitarget cluster.

Initialization includes transforming the initial probability matrix $P=\{P_{ij}\}$, where $i=1,m$ and $j=1,n$, into a corresponding negative-log-likelihood matrix $L=-\ln(P_{ij})$ and obtaining a solution of the optimal assignment of measurements (row indices) to targets (column indices) by applying the technique to L. The solution is the maximum-likelihood hypothesis and a corresponding negative-log-likelihood. The solution of the maximum-likelihood hypothesis is used to initialize a set of matrix pointers. After the initialization process, the remaining N−1 best hypotheses are computed by a recursively-computed sequence of sweeps.

Each sweep begins by generating pointers to the elements of the P matrix from the preceding sweeps retained set of pointers/hypotheses. Then elements in the P matrix indicated by the pointers are zeroed out, the L matrix is recomputed, and the linear-assignment-problem-generated hypotheses and negative-log-likelihoods are computed. The process is repeated for the remaining pointers and hypotheses combinations. Each hypothesis and negative-log-likelihood generated during a sweep is a candidate for inclusion in a retained list. Hypotheses are placed in the retained list in ascending order of their negative-log-likelihoods. The list includes a list number, hypothesis, and its associated negative-log-likelihood.

Hypotheses are added to the retained list until the list is full. The list is then sorted and when a new hypothesis has a negative-log-likelihood that is smaller than the negative-log-likelihood of the last hypothesis in the list, the last hypothesis is replaced by the new hypothesis and the list is sorted again by negative-log-likelihoods. Entries are generated for the list until the sweep is completed. The pointers used to generate the list of hypotheses on each sweep are saved along with their generated hypotheses. After completion of a sweep, duplicate pointer sets to the same hypothesis are eliminated. The next sweep begins with the pointers and hypotheses that were generated on the prior sweep and added to the retained list.

The process terminates when no hypothesis has a negative-log-likelihood that is smaller than the negative-log-likelihood of the last hypothesis in the list or the negative-log-likelihood of the last hypothesis in the list remains constant for two successive sweeps, while the list is full.

When the sweep process is completed, the retained list includes the N-best feasible hypotheses in ascending order of their negative-log-likelihoods. These target-oriented hypotheses are converted into measurement-oriented hypotheses. The measurements that were not assigned to a target represent new targets.

For a given cluster and hypothesis h let:

$P_{n,h}$=the hypotheses probability computed by the cluster formation function for the $n^{th}$ frame and hypothesis h $Z_j=(x_j, y_j)^T$ be the $j^{th}$ observation linked to the cluster by the cluster formation function j=1, 2, . . . , N, which spans the detections in the n+1 frame $x_{n,i}$=the $i^{th}$ x state related to h i=1,2, . . . , M, which spans the tracks $L_{x,n,i}$=the $i^{th}$ x-state lower triangular covariance matrix factor $y_{n,i}$=the $i^{th}$ y state related to h $L_{y,n,i}$=the $i^{th}$ y-state lower triangular covariance matrix factor.

The negative-log-likelihood matrix is computed as follows:

$$x_{n+1,i}=\Phi(n+1,n)x_{n,i}=[x, \dot{x}, \ddot{x}]^T_{n+1,i}$$

$$P_{x,n+1,i}=[\Phi(n+1,n)L_{x,n,i}][\Phi(n+1,n)L_{x,n,i}]^T+\Gamma_{x,n+1}$$

$$R_{x,n+1,i}=P_{x,n+1,i}(1,1)+\sigma_x^2$$

$$l_{x,i,j}=-\tfrac{1}{2}\ln(2\pi)-\tfrac{1}{2}\ln(R_{x,n+1,i})-\tfrac{1}{2}(x_j-x_i)^2/R_{x,n+1,i}$$

$$y_{n+1,i}=\Phi(n+1,n)y_{n,i}=[y, \dot{y}, \ddot{y}]^T_{n+1,i}$$

$$P_{y,n+1,i}=[\Phi(n+1,n)L_{y,n,i}][\Phi(n+1,n)L_{y,n,i}]^T+\Gamma_{y,n+1}$$

$$R_{y,n+1,i}=P_{y,n+1,i}(1,1)+\sigma_y^2$$

$$l_{y,i,j}=-\tfrac{1}{2}\ln(2\pi)-\tfrac{1}{2}\ln(R_{y,n+1,i})-\tfrac{1}{2}(y_j-y_i)^2/R_{y,n+1,i}$$

$$l_{i,j}=l_{x,i,j}+l_{y,i,j}$$

$$L=\{-l_{i,j}\} \quad i=1,2,\ldots,M$$
$$\phantom{L=\{-l_{i,j}\}} \quad j=1,2,\ldots,N,$$

where L is the negative-log-likelihood matrix.

The N-best feasible hypotheses tracking technique is used to find the N-best track-to-observation assignments in L. Two cases are considered, one in which M<N, where there are less hypothesis-related tracks than detections, and one in which M≧N. When M<N, the optimal assignment pairs $(i,\Phi(i))$, i=1, 2, . . . , M are determined by minimizing the corresponding negative-log-likelihood function, such that:

$$L_h = \sum_{i=1}^{M} l_{i,\Phi(i)} \text{ is a minimum,}$$

where $\Phi(i)$ is a one-to-one mapping of the integers 1, 2, . . . , M into the integers 1, 2, . . . , N. The measurements that do not appear in the assignments are handled as unmatched detections for track initiation.

When M≧N, there are at least as many hypothesis-related tracks as there are detections. If M>N, then M−N targets are left unassigned to any detection associated with the cluster. The optimal assignment pairs $(\Phi(j),j)$, j=1, 2, . . . , N are determined by minimizing the corresponding negative-log-likelihood function, such that:

$L_h = \sum_{j=1}^{N} l_{\Phi(j),j}$ is a minimum, where $\Phi(j)$ is a one-to-one mapping of the integers 1, 2, . . . , N into the integers 1, 2, . . . , M. Any tracks that are not assigned to detections are candidates for track termination.

For each hypothesis h, the hypothesis probability P(n+1|n,h) for the n+1 frame is determined as follows:

$\lambda(n+1|n,h) = P(n,h)\exp(-L_h)$, where P(n,h) is the probability for the $n^{th}$ frame.

$P = \sum_h \lambda(n + 1|n, h)$ $P(n + 1|n, h) = \lambda(n + 1|n, h)/P(\text{normalized})$ If for any h, $P(n+1|n,h) < P_{min}$, then the probability P is recomputed without the corresponding $\lambda(n+1|n,h)$ and the remaining $\lambda(n+1|n,h)$ are renormalized.

The N-best feasible tracking technique provides greatly enhanced computational speeds compared to the conventional Nagarajan et al. technique. For example, in a representative benchmark test on a Digital Equipment Corp. 11/785, the Nagarajan et al. method required 0.19 sec. for a 4×4 track/measurement matrix with 24 feasible hypotheses and the N-best feasible hypotheses technique required only 0.03 sec. For a 5×5 track/measurement matrix with 120 feasible hypotheses, the conventional method required 2.49 sec. and the N-best feasible hypotheses technique required only 0.24 sec. For a 6×6 track/measurement matrix with 720 feasible hypotheses, the conventional method required 90 sec. and the N-best feasible hypotheses technique required only 0.38 sec. For a 7×7 track/measurement matrix with 5040 feasible hypotheses, the conventional method required 4422 sec. and the N-best feasible hypotheses technique required only 0.57 sec. Therefore, the Nagarajan et al. method becomes impractical in terms of computation time for track/measurement matrices greater than 6×6. The computation speed improvement in measurement-to-target association by the N-best feasible hypotheses technique makes multiple hypothesis tracking practical for the first time.

The N-best feasible hypotheses tracking technique can be used in any staring or scanning optical system. The technique can be used to track a large number of closely spaced objects in boost, post-boost, midcourse and terminal trajectory phases. The technique has a track assembly purity greater than 95%, for closely spaced objects, compared to track assembly purities on the order of 30 to 40% for prior art techniques. Track assembly purity is defined as the percentage of observations in a track that comes from the same real object. High track purities are required for accurate launch parameter estimation, target typing and target discrimination for closely spaced objects in all phases of flight.

Target State Update - The target state update function 42 updates the state and covariance matrices or target equations using standard linear Kalman filter equations for each cluster, each cluster hypothesis, and each track hypothesis, as follows:

$\bar{x}_{n+1} = \Phi(n+1, n)x_n$ $P_{x,n+1} = [\Phi(n+1, n)L_{x,n}][\Phi(n+1, n)L_{x,n}]^T + \Gamma_{x,n+1}$ $R_x = P_{x,n+1}(1,1) + \sigma_x^2$ $K_x = 1/R_x[P_{x,n+1}(1,1), P_{x,n+1}(2,1), P_{x,n+1}(3,1)]^T$ $\tilde{x}_{n+1} = \bar{x}_{n+1} + K_x[x - \bar{x}_{n+1}]$ $\tilde{P}_{x,n+1} = P_{x,n+1} - K_x[P_{x,n+1}(1,1), P_{x,n+1}(2,1), P_{x,n+1}(3,1)]$ $\tilde{P}_{x,n+1} = L_{x,n+1}L_{x,n+1}^T$ (Cholesky Decomposition)

$\bar{y}_{n+1} = \Phi(n+1, n)y_n$ $P_{y,n+1} = [\Phi(n+1, n)L_{y,n}][\Phi(n+1, n)L_{y,n}]^T + \Gamma_{y,n+1}$ $R_y = P_{y,n+1}(1,1) + \sigma_y^2$ $K_y = 1/R_y[P_{y,n+1}(1,1), P_{y,n+1}(2,1), P_{y,n+1}(1,3)]^T$ $\tilde{y}_{n+1} = \bar{y}_{n+1} + K_y[y - \bar{y}_{n+1}]$ $\tilde{P}_{n+1} = P_{y,n+1} - K_y[P_{y,n+1}(1,1), P_{y,n+1}(2,1), P_{y,n+1}(3,1)]$ $\tilde{P}_{y,n+1} = L_{y,n+1}L_{y,n+1}^T$ (Cholesky Decomposition), where $K_x$ and $K_y$ are the Kalman filter gains. $\tilde{x}_{n+1}$ and $\tilde{y}_{n+1}$ are the updated x and y states, x and y are the measurements assigned to the x and y states in the hypothesis generation function 40, and $\tilde{P}_{x,n+1}$ and $\tilde{P}_{y,n+1}$ are the updated covariance matrices. The Cholesky decomposition is used for numerical stability.

Scan Output - The scan output function 44 outputs the assembled tracks of observations in stabilized focal-plane coordinates and associated in-band intensities to the target typer 12.

Next Scan - The next scan function 46 loops the tracking process to the scan input function 36 for each new scan.

Track Termination

The track termination function 34 drops any track that misses a specified number of consecutive detections. The track termination function also includes a clutter rejection function.

TARGET TYPER

The target typer 14 provides discrimination of target class by processing the intensity data. The target typer determines target type by fitting measured focal-plane intensities to candidate target intensities-at-the source profiles, angle between launch and current position vector profiles and height. A set of candidate types of targets is first determined by an initial estimate of the launch point. For example, a sea launch classifies the target as a sea-launched ballistic missile rather than a land-based missile. The launch point is estimated by assuming the first observation occurs at a nominal height above the earth surface. For each such candidate type, an initial set of launch parameters is determined from the first line-of-sight and last observations of the collected track. These launch parameters are then iterated to fit the observed intensities with a model of attenuated intensity as a function of range, height, slant angle, aspect angle and the previously-mentioned profiles. The candidate types are then pruned by a Chi-squared threshold test on the goodness of fit to observed to predicted intensities.

LAUNCH PARAMETER ESTIMATOR

The launch parameter estimator 16 uses the assembled track observations to generate a target launch state vector and a launch state error covariance matrix. The launch state vector and covariance matrix are used to accurately propagate forward each target's trajectory. The launch parameter estimator uses a batch nonlinear least squares algorithm that fits stabilized focal-plane line-of-sight (LOS) coordinates to a five parameter model. These five parameters are target launch latitude and longitude, launch azimuth, launch time, and pitchover angle. Pitchover angle characterizes the trajectory as it ranges from lofted to nominal to depressed as the pitchover angle increases. The fitting process is accomplished with three type-dependent profiles, including angle from launch, height, and time under gravity. These profiles are two-dimensional tables that represent the three trajectory variables as a function of time and pitchover angle. The time under gravity profile uses an inertial-steering-plane coordinate system and accounts for both initial velocity at launch due to the earth's rotation and gravity variation along the trajectory. The estimator 16 also provides an identification of the target type by selecting the candidate from the target typer 14 with the lowest Chi-squared goodness of fit to observed versus predicted LOS coordinates. The inertial-steering-plane coordinate system has a vertical axis along the local geodetic at launch, another axis perpendicular to the vertical axis in the direction of the launch and a third axis perpendicular to the other two.

Conventional tracking systems use tabulated profiles for each type of target, including down range and height versus time in earth-centered, earth-fixed coordinates, to fit observed azimuth and elevation LOS angles to predictions as a function of launch geodetic latitude and longitude, launch azimuth, launch time, and trajectory lofting. However, this method breaks down for high zenith angle cases. The present invention also uses tabulated profiles, but these profiles are generated in an inertial-steering-plane coordinate system and the trajectories are represented by a family of down range and height components versus time in an in-plane and out-of-plane coordinate system, which is parameterized by the pitchover angle. Using an inertial-steering-plane coordinate system models much more realistically the trajectories of ballistic missiles and is less susceptible to trajectory observability problems. It also provides doubled mono tracking tactical parameter accuracy and reduces the incidence of azimuth estimate flipover.

OPTIMAL TARGET DATA ASSOCIATOR

The optimal target data associator 18 finds the best assignment of M target launch states generated from one sensor's observations with N target launch states generated from another sensor's observations. State-to-state association is used instead of LOS-to-LOS association since states are time invariant and, therefore, can be associated without having to interpolate data to a common time.

Figure 4:
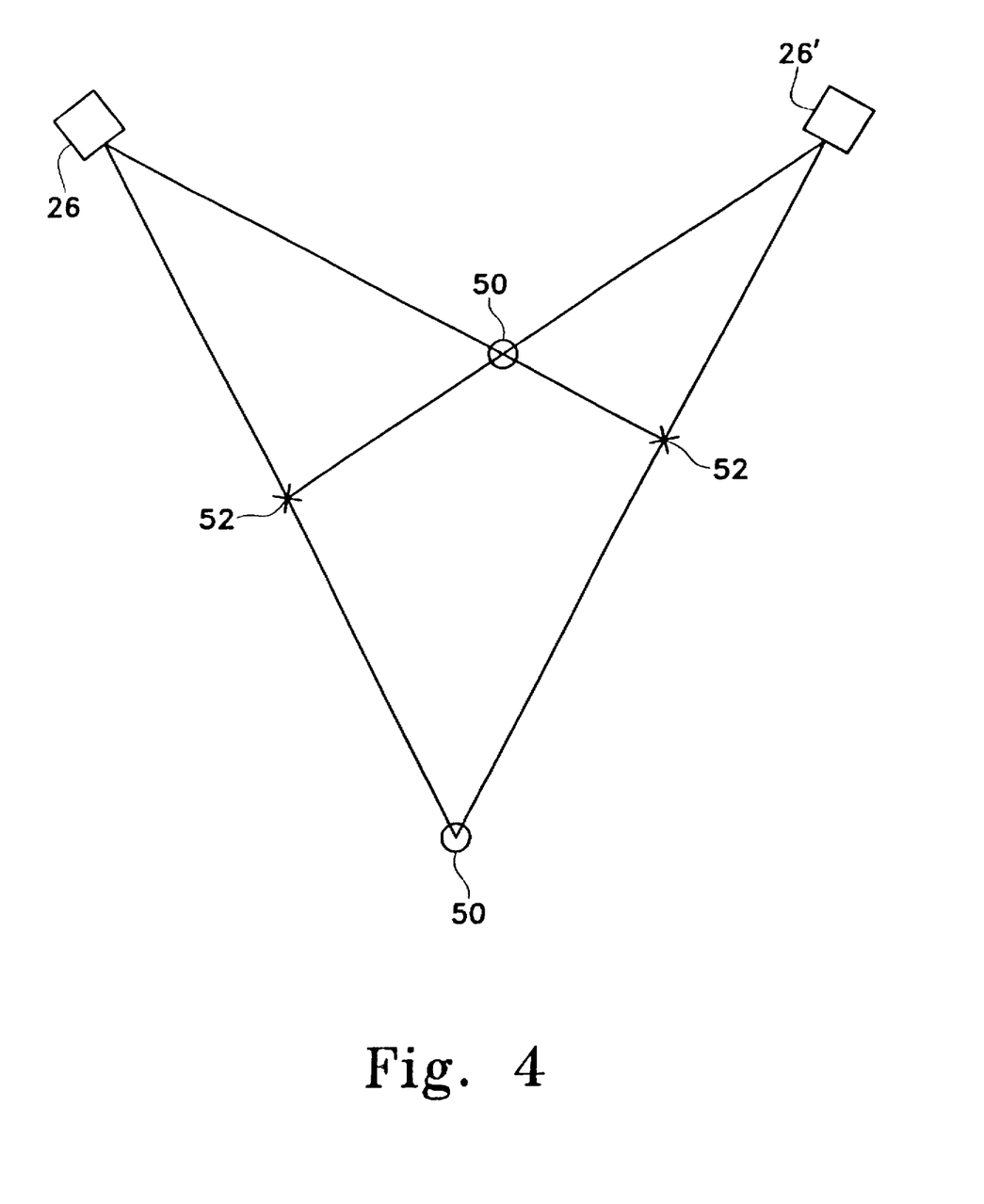
FIG. 4 illustrates the effect of ghosting which occurs when a multitarget tracking system uses line-of-sight (LOS) to line-of-sight (LOS) association and fusion instead-of state-to-state association and fusion.

Current LOS-to-LOS association techniques deal with measurements from two sensors taken at different times. Interpolating LOS measurements to a common time introduces colored noise. LOS-to-LOS association also has ghosting problems, which results in incorrect associations. FIG. 4 shows the effect of ghosting which occurs when using line-of-sight association with electrooptical sensors. With two real targets, a total of four intersections results, including two ghosts or ambiguities 50 and two real targets 52. The number of ambiguities increases rapidly with the number of targets.

The optimal target data associator 18 operates as follows:

1) Determine which target launch points are in the common field of view of both sensors.
2) Compute an MxN matrix of negative-log-likelihoods relating one sensor's target launch states with the other sensor's target launch states. This is the same type of negative-log-likelihood computation as is done in the target tracker 12. The (i,j) entry of the assignment matrix represents the likelihood that the $i^{th}$ state vector from the first sensor corresponds to the $j^{th}$ state vector from the second sensor.
3) A linear assignment problem solution algorithm operating on the MxN matrix is then used to find the optimal assignment of the first sensor/second sensor target state associations that minimizes the sum of entries over all assignments where the summands are taken from at most one row and one column.
4) After the optimal assignment is made, individual assignments are further validated by thresholding the corresponding assignment Chi-squared values. Assignments with too large a Chi-squared value are rejected.

State-to-state association eliminates time synchronization, colored noise, and ghosting problems of LOS-to-LOS stereo association. It provides improved accuracy of stereo association of target states with association accuracies of 95% or better for closely spaced objects compared to 40 to 50% for LOS-to-LOS association. It also provides a much smaller error ellipse, by reducing a typical 1 km launch error to a 300 m launch error.

OPTIMAL TARGET DATA COMBINER

The optimal target data combiner 20 fuses the two launch state vectors and state error covariance matrices from the infrared sensors 26, 26' into one state vector and covariance matrix, providing a much more accurate launch state vector. The optimal combiner 20 fuses the corresponding states by a method identical to an inverse covariance matrix weighting of states, but requires only one inversion of a 5×5 matrix instead of three. The covariance matrix of the optimal state vector is generated with an additional matrix multiply. Fusion is performed only if the target data from both sensors pass a Chi-squared threshold test on their individual Chi-squared launch parameter values.

TARGET STATE INITIALIZER

The target state initializer 22 transforms the time-invariant target launch state vector and launch state error covariance matrix from the launch parameter estimator 16 into an initial inertial target state vector and target state error covariance matrix. The target state vector is a 20 component state vector, including inertial position and velocity, as well as missile mass, mass flow rate, specific impulse, and drag coefficient. The initializer computes only the "dynamical" state elements and their corresponding covariance matrix elements, while obtaining the remaining state and covariance matrix elements from a target database. The initializer operates in both mono and stereo tracking modes. The target launch state vector from the launch parameter estimator 16 is used if there is no association and fusion of launch states by the optimal target data associator 18 and combiner 20, while the combined launch state vector from the optimal target data combiner is used if there is association and fusion by the optimal target data associator and combiner. The target state initializer 22 decomposes the initial state error covariance matrix into the product of lower and upper triangular factors. A propagation algorithm then propagates the target state vector and target state error covariance matrix lower triangular factor to the first observation time.

TARGET STATE ESTIMATOR

The target state estimator 24 recursively updates the target state vector and target state error covariance matrix from a sequence of sensor measurements. After a track is established and the inertial state vector and covariance matrix are initialized, data is received directly from the target trackers 12, 12'. The target state estimator 24 accurately models missile trajectory dynamics, compared with the conventional method of real time inertial state estimation, which is a kinematic approach in which target position, velocity and acceleration vectors are estimated from measurement data. A constant acceleration over short time intervals is assumed in order to predict future position and velocity. A major problem with this conventional method is that sensor revisit time may be too long for a constant acceleration assumption, so kinematic track filters may require unreasonably short intermeasurement intervals for convergence. Also, these kinematic track filters have a limited predict ahead accuracy, which is usually no more than 10 to 20 seconds. In addition, these track filters have limited accuracy, cannot detect and track through staging events, or propagate over long intervals to nominal burn out times.

The target state estimator 24 of the present invention is a real time Kalman filter for tracking multistage rockets. It can update a thrusting target's state vector and covariance matrix from either mono or stereo sensor interleaved LOS measurements. It can detect staging, propagate through coasting, and reinitialize at reignition of the next stage. The Kalman filter can extrapolate powered flight trajectories accurately over intervals of several minutes or longer without measurement updates. This open loop propagation feature gives the estimator a unique ability to perform below-the-horizon to above-the-horizon trajectory correlation and state vector handoff alerting and queuing of data of high utility for data fusion. It includes an adaptive mechanism for compensating for nonlinear dynamics.

The inertial state estimator 24 uses the differential equations of motion of a thrusting vehicle. The estimator predicts by numerically integrating the equations of motion with a second order truncated Taylor series. It uses partial differentiation of the Taylor series integration formula to efficiently approximate the Kalman filter state transition matrix. This eliminates the computer memory and computation time ordinarily required to numerically integrate a large number of variational equations or Ricatti differential equations for the covariance matrix. Staging detection is performed with a Chi-squared detection logic combined with windows around nominal staging times. Current methods of inertial state estimation provide position and velocity estimation accuracies of 1 to 2 km and 100 to 200 m/sec. The present invention has error ranges of 200 to 500 m and 50 to 100 m/sec.

Although the invention has been described in the context of space-based early warning systems using infrared sensors, the invention is also suitable for use in other types of sensor systems requiring multitarget tracking of closely spaced objects, such as ground-based early warning systems, air-launched interceptor missiles, and air traffic control systems. Other types of sensors can be used, such as electrooptical sensors operating in the visible frequency range or radar sensors operating in the microwave or millimeter wave frequency ranges. The sensor can be either a staring or scanning sensor.

From the foregoing, it will be appreciated that the present invention represents a significant advance in the field of multitarget tracking systems. Although several preferred embodiments of the invention have been shown and described, it will be apparent that other adaptations and modifications can be made without departing from the spirit and scope of the invention. Accordingly, the invention is not to be limited, except as by the following claims.

We claim:

1. An N-best feasible hypotheses multitarget tracking system for accurately tracking large numbers of closely spaced objects in a dense target environment in real time, comprising:

a sensor for generating target line-of-sight (LOS) measurements during multiple scans of a target environment;

means for generating initial track state vectors and state error covariance matrices from an initial set of scan measurements and subsequent track state vectors and state error covariance matrices from subsequent sets of scan measurements, subsequent measurements being assigned to previous track states and covariance matrices or new track states and covariance matrices;

means for partitioning the initial and subsequent scan measurements into clusters, each cluster being assigned a number of hypotheses for associating measurements to track states and covariance matrices;

means for propagating existing track states and covariance matrices associated with a scan to a successive scan to provide prediction of the location of the next measurement;

means for setting gates about the predicted location;

means for constructing a negative-log-likelihood matrix relating predicted to actual measurement locations for each hypothesis in each cluster;

means for generating directly, non-combinatorially and in real time N-best feasible hypotheses, ranked according to their probability, from the negative-log-likelihood matrix, to provide discrete optimization based on solving the linear assignment problem; and means for updating the track state vectors and covariance matrices after each subsequent scan with the associated subsequent measurements of the N-best hypotheses, thus providing accurate tracking of large numbers of closely spaced objects in a dense target environment.

2. An N-best feasible hypotheses multitarget tracking system for accurately tracking large numbers of closely spaced objects in a dense target environment in real time, comprising:

a sensor for generating target line-of-sight (LOS) measurements during multiple scans of a target environment;

means for generating initial track state vectors and state error covariance matrices from an initial set of scan measurements and subsequent track state vectors and state error covariance matrices from subsequent sets of scan measurements, subsequent measurements being assigned to previous track states and covariance matrices or new track states and covariance matrices;

means for partitioning the initial and subsequent scan measurements into clusters, each cluster being assigned a number of hypotheses for associating measurements to track states and covariance matrices;

means for propagating existing track states and covariance matrices associated with a scan to a successive scan to provide prediction of the location of the next measurement;

means for setting gates about the predicted location;

means for constructing a negative-log-likelihood matrix relating predicted to actual measurement locations for each hypothesis in each cluster;

means for generating directly, non-combinatorially and in real time N-best feasible hypotheses from the negative-log-likelihood matrix, wherein the means for generating N-best feasible hypotheses includes means for finding an unconstrained solution to the linear assignment problem in which all matrix entries can participate, means for finding a set of assignments at a first sweep that excludes just one of the entries found in the optimal solution, which after neglecting duplicate assignments must include the second best assignment, means for forming a set of excluded doubletons by eliminating duplicate solutions, sorting, and retaining all the assignments of the set in ascending order of their values, the excluded doubletons being pairs of matrix entries in which the first matrix entry comes from the set of singletons in the optimal assignment and the second entry comes from assignments generated from the first sweep that were added to the retained assignment list, means for finding a set of linear assignment problem solutions that excludes each of these pairs at a second sweep, which are sorted and merged into the retained assignment list and must include the third best assignment, and means for constructing sets of excluded tripletons, excluded quadruples, and excluded n-tuples until a sweep is reached in which none of the linear assignment problem solutions have a value smaller than the Nth best solution already contained in the list; and means for updating the track state vectors and covariance matrices after each subsequent scan with the associated subsequent measurements of the N-best hypotheses, thus providing accurate tracking of large numbers of closely spaced objects in a dense target environment.

3. An N-best feasible hypotheses multitarget tracking system for accurately tracking large numbers of closely spaced objects in a dense target environment in real time, comprising:

an electrooptical sensor for generating target line-of-sight (LOS) measurements during multiple scans of a target environment;

means for generating initial track state vectors and state error covariance matrices from an initial set of scan measurements and subsequent track state vectors and state error covariance matrices from subsequent sets of scan measurements, subsequent measurements being assigned to previous track states and covariance matrices or new track states and covariance matrices;

means for partitioning the initial and subsequent scan measurements into clusters, each cluster being assigned a number of hypotheses for associating measurements to track states and covariance matrices;

means for propagating existing track states and covariance matrices associated with a scan to a successive scan to provide prediction of the location of the next measurement;

means for setting gates about the predicted location;

means for constructing a negative-log-likelihood matrix relating predicted to actual measurement locations for each hypothesis in each cluster;

means for generating directly, non-combinatorially and in real time N-best feasible hypotheses from the negative-log-likelihood matrix; and means for updating the track state vectors and covariance matrices after each subsequent scan with the associated subsequent measurements of the N-best hypotheses, thus providing accurate tracking of large numbers of closely spaced objects in a dense target environment.

4. An N-best feasible hypotheses multitarget tracking system for accurately tracking large numbers of closely spaced objects in a dense target environment in real time, comprising:

an infrared sensor for generating target line-of-sight (LOS) measurements during multiple scans of a target environment;

means for generating initial track state vectors and state error covariance matrices from an initial set of scan measurements and subsequent track state vectors and state error covariance matrices from subsequent sets of scan measurements, subsequent measurements being assigned to previous track states and covariance matrices or new track states and covariance matrices;

means for partitioning the initial and subsequent scan measurements into clusters, each cluster being assigned a number of hypotheses for associating measurements to track states and covariance matrices;

means for propagating existing track states and covariance matrices associated with a scan to a successive scan to provide prediction of the location of the next measurement;

means for setting gates about the predicted location;

means for constructing a negative-log-likelihood matrix relating predicted to actual measurement locations for each hypothesis in each cluster;

means for generating directly, non-combinatorially and in real time N-best feasible hypotheses from the negative-log-likelihood matrix; and means for updating the track state vectors and covariance matrices after each subsequent scan with the associated subsequent measurements of the N-best hypotheses, thus providing accurate tracking of large numbers of closely spaced objects in a dense target environment.

5. A method for performing two-dimensional kinematic track assembly by scan-to-scan association of new observations to existing tracks, comprising the steps of:

generating initial track state vectors and state error covariance matrices from an initial set of scan measurements and subsequent track state vectors and state error covariance matrices from subsequent sets of scan measurements, subsequent measurements being assigned to previous track states and covariance matrices or new track states and covariance matrices;

partitioning the initial and subsequent scan measurements into clusters, each cluster being assigned a number of hypotheses for associating measurements to track states and covariance matrices;

propagating existing track states and covariance matrices associated with a scan to a successive scan to provide prediction of the location of the next measurement;

setting gates about the predicted location;

constructing a negative-log-likelihood matrix relating predicted to actual measurement locations for each hypothesis in each cluster;

generating directly, non-combinatorially and in real time N-best feasible hypotheses from the negative-log-likelihood matrix, wherein the step of generating the N-best feasible hypotheses includes the steps of finding an unconstrained solution to the linear assignment problem in which all matrix entries can participate, finding a set of assignments at a first sweep that excludes just one of the entries found in the optimal solution, which after neglecting duplicate assignments must include the second best assignment, forming a set of excluded doubletons by eliminating duplicate solutions, sorting, and retaining all the assignments of the set in ascending order of their values, the excluded doubletons being pairs of matrix entries in which the first matrix entry comes from the set of singletons in the optimal assignment and the second entry comes from assignments generated from the first sweep that were added to the retained assignment list,

19 finding a set of linear assignment problem solutions that excludes each of these pairs at a second sweep, which are sorted and merged into the retained assignment list and must include the third best assignment, and constructing sets of excluded tripletons, excluded quadtuples, and excluded n-tuples until a sweep is reached in which none of the linear assignment problem solutions have a value smaller than the Nth best solution already contained in the list; and updating the track state vectors and covariance matrices after each subsequent scan with the associated subsequent measurements of the N-best hypotheses, thus providing accurate tracking of large numbers of closely spaced objects in a dense target environment.

6. A multitarget tracking system for accurately tracking large numbers of closely spaced objects in a dense target environment in real time, comprising:

means for generating an initial estimate of a target's launch position, launch direction, launch time, and pitchover angle using assembled track data from a first sensor to determine the type of target;

means for comparing observed intensity measurements to intensity values based on database profiles to determine the type of target using data from the first sensor.

means for generating an initial estimate of a target's launch position, launch direction, launch time, and pitchover angle using assembled track data from a second sensor to determine the type of target;

means for comparing observed intensity measurements to intensity values based on database profiles to determine the type of target using data from the second sensor;

means for generating a target launch state vector and state error covariance matrix from the assembled track data from the second sensor;

optimal target data association means for identifying which target launch locations are in a common field of view between the two sensors and comparing a number of the target launch states generated from the assembled track data from the two sensors using state-to-state association to produce a set of optimally matched pairs of target states and error covariance matrices and a set of unmatched target states and covariance matrices, wherein the optimal target data association means includes means for optimally combining the target states and error covariance matrices of each matched pair into one state vector and its associated state error covariance matrix; and target state initialization means for initializing an inertial stereo target state vector and state error covariance matrix for the matched targets and an inertial mono target state vector and error covariance matrix for the unmatched targets from either sensor.

7. A multitarget tracking method for accurately tracking large numbers of closely spaced objects in a dense target environment in real time, comprising the steps of:

generating an initial estimate of a target's launch position, launch direction, launch time, and pitchover angle using assembled track data from a first sensor to determine the type of target;

comparing observed intensity measurements to intensity values based on database profiles to determine the type of target using data from the first sensor;

generating an initial estimate of a target's launch position, launch direction, launch time, and pitchover angle

20 using assembled track data from a second sensor to determine the type of target;

comparing observed intensity measurements to intensity values based on database profiles to determine the type of target using data from the second sensor;

generating a target launch state vector and state error covariance matrix from the assembled track data from the second sensor;

identifying which target launch locations are in a common field of view between the two sensors and comparing a number of the target launch states generated from the assembled track data from the two sensors using state-to-state association to produce a set of optimally matched pairs of target states and error covariance matrices and a set of unmatched target states and covariance matrices;

optimally combining the target states and error covariance matrices of each matched pair into one state vector and its associated state error covariance matrix; and initializing an inertial stereo target state vector and state error covariance matrix for the matched targets and an inertial mono target state vector and error covariance matrix for the unmatched targets from either sensor.

8. An N-best feasible hypotheses multitarget tracking system for accurately tracking large numbers of closely spaced objects in a dense target environment in real time, comprising:

a sensor for generating target line-of-sight (LOS) measurements during multiple scans of a target environment;

means for generating initial track state data from an initial set of scan measurements and subsequent track state data from subsequent sets of scan measurements, subsequent measurements being assigned to previous track state data or to new track state data;

means for partitioning the initial and subsequent scan measurements into clusters, each cluster being assigned a number of hypotheses for associating measurements to track state data;

means for propagating existing track state data associated with a scan to a successive scan to provide prediction of the location of the next measurement;

means for setting gates about the predicted location;

means for constructing a matrix relating predicted to actual measurement locations for each hypothesis in each cluster;

means for generating from the matrix directly, non-combinatorially and in real time N-best feasible hypotheses, ranked according to their probability, to provide discrete optimization based on solving the linear assignment problem; and means for updating the track state data after each subsequent scan with the associated subsequent measurements of the N-best hypotheses, thus providing accurate tracking of large numbers of closely spaced objects in a dense target environment.

9. A method for performing two-dimensional kinematic track assembly by scan-to-scan association of new observations to existing tracks, to provide discrete optimization based on solving the linear assignment problem, the method comprising the steps of:

generating initial track state data from an initial set of scan measurements and subsequent track state data from subsequent sets of scan measurements, subsequent measurements being assigned to previous track state data or to new track state data;

21 partitioning the initial and subsequent scan measurements into clusters, each cluster being assigned a number of hypotheses for associating measurements to track state data;

propagating existing track state data associated with a scan to a successive scan to provide prediction of the location of the next measurement;

setting gates about the predicted location;

constructing a matrix relating predicted to actual measurement locations for each hypothesis in each cluster;

generating from the matrix directly, non-combinatorially and in real time N-best feasible hypotheses, ranked according to their probability, to provide discrete optimization based on solving the linear assignment problem; and updating the track state data after each subsequent scan with the associated subsequent measurements of the N-best hypotheses, thus providing accurate tracking of large numbers of closely spaced objects in a dense target environment.

10. The multitarget tracking system as set forth in claim 6, and further including:

target state estimator means for recursively updating the target state vector and state error covariance matrix from either stereo or mono line-of-sight data from the assembled target track data.

11. A method for performing two-dimensional kinematic track assembly by scan-to-scan association of new observations to existing tracks, to provide discrete optimization based on solving the linear assignment problem. the method comprising the steps of:

generating initial track state vectors and state error covariance matrices from an initial set of scan measurements and subsequent track state vectors and state error covariance matrices from subsequent sets of scan measurements, subsequent measurements being assigned to previous track states and covariance matrices or new track states and covariance matrices;

partitioning the initial and subsequent scan measurements into clusters, each cluster being assigned a number of hypotheses for associating measurements to track states and covariance matrices;

propagating existing track states and covariance matrices associated with a scan to a successive scan to provide prediction of the location of the next measurement;

setting gates about the predicted location;

constructing a negative-log-likelihood matrix relating predicted to actual measurement locations for each hypothesis in each cluster;

generating directly, non-combinatorially and in real time N-best feasible hypotheses, ranked according to the probability from the negative-log-likelihood matrix, to provide discrete optimization based on solving the linear assignment problem; and updating the track state vectors and covariance matrices after each subsequent scan with the associated subsequent measurements of the N-best hypotheses, thus providing accurate tracking of large numbers of closely spaced objects in a dense target environment.

12. A technique for generating directly, non-combinatorially and in real time N-best feasible hypotheses of track-to-measurement assignments from a linear assignment problem solution to the negative-log-likelihood matrices of track-to-measurement assignments, comprising the steps of:

22 finding an unconstrained solution to the linear assignment problem in which all matrix entries can participate;

finding a set of assignments at a first sweep that excludes just one of the entries found in the optimal solution, which after neglecting duplicate assignments must include the second best assignment;

forming a set of excluded doubletons by eliminating duplicate solutions, sorting, and retaining all the assignments of the set in ascending order of their values, the excluded doubletons being pairs of matrix entries in which the first matrix entry comes from the set of singletons in the optimal assignment and the second entry comes from assignments generated from the first sweep that were added to the retained assignment list;

finding a set of linear assignment problem solutions that excludes each of these pairs at a second sweep, which are sorted and merged into the retained assignment list and must include the third best assignment; and constructing sets of excluded tripletons, excluded quadtuples, and excluded n-tuples until a sweep is reached in which none of the linear assignment problem solutions have a value smaller than the Nth best solution already contained in the list.

13. A multitarget tracking system for accurately tracking large numbers of closely spaced ballistic missiles in a dense target environment in real time, comprising:

means for generating an initial estimate of a target missile's launch position, launch direction, launch time, and pitchover angle using assembled track data from a first sensor to determine the type of target missile; and means for comparing observed intensity measurements to intensity values based on database profiles to determine the type of target missile using data from the first sensor.

14. The multitarget tracking system as set forth in claim 13, and further including:

means for generating a target missile launch state vector and state error covariance matrix from the assembled track data from the first sensor.

15. The multitarget tracking system as set forth in claim 13, and further including:

means for generating an initial estimate of a target missile's launch position, launch direction, launch time, and pitchover angle using assembled track data from a second sensor to determine the type of target missile; and means for comparing observed intensity measurements to intensity values based on database profiles to determine the type of target missile using data from the second sensor.

16. The multitarget tracking system as set forth in claim 15, and further including:

means for generating a target missile launch state vector and state error covariance matrix from the assembled track data from the second sensor; and optimal target missile data association means for identifying which target missile launch locations are in a common field of view between the two sensors and comparing a number of the target missile launch states generated from the assembled track data from the two sensors using state-to-state association to produce a set of optimally matched pairs of target missile states and error covariance matrices and a set of unmatched target missile states and covariance matrices.

17. The multitarget tracking system as set forth in claim 16, wherein the optimal target missile data association means includes:

means for optimally combining the target missile states and error covariance matrices of each matched pair into one state vector and its associated state error covariance matrix.

18. A multitarget tracking method for accurately tracking large numbers of closely spaced ballistic missiles in a dense target environment in real time, comprising the steps of:

generating an initial estimate of a target missile's launch position, launch direction, launch time, and pitchover angle using assembled track data from a first sensor to determine the type of target missile; and comparing observed intensity measurements to intensity values based on database profiles to determine the type of target missile using data from the first sensor.

19. The multitarget tracking method as set forth in claim 18, and further including the step of:

generating a target missile launch state vector and state error covariance matrix from the assembled track data from the first sensor.

20. The multitarget tracking method as set forth in claim 18, and further including the steps of:

generating an initial estimate of a target missile's launch position, launch direction, launch time, and pitchover angle using assembled track data from a second sensor to determine the type of target missile; and comparing observed intensity measurements to intensity values based on database profiles to determine the type of target missile using data from the second sensor.

21. The multitarget tracking method as set forth in claim 20, and further including the steps of:

generating a target missile launch state vector and state error covariance matrix from the assembled track data from the second sensor; and identifying which target missile launch locations are in a common field of view between the two sensors and comparing a number of the target missile launch states generated from the assembled track data from the two sensors using state-to-state association to produce a set of optimally matched pairs of target missile states and error covariance matrices and a set of unmatched target missile states and covariance matrices.

22. The multitarget tracking method as set forth in claim 21, and further including the step of:

optimally combining the target missile states and error covariance matrices of each matched pair into one state vector and its associated state error covariance matrix.

23. The multitarget tracking method as set forth in claim 7, and further including the step of:

recursively updating the target state vector and state error covariance matrix from either stereo or mono line-of-sight data from the assembled target track data.

24. An N-best feasible hypotheses multitarget tracking system for accurately tracking large numbers of closely spaced objects in a dense target environment in real time, comprising:

a first sensor for generating target line-of-sight (LOS) measurements during multiple scans of a target environment;

means for generating initial track state vectors and state error covariance matrices from an initial set of first sensor scan measurements and subsequent track state vectors and state error covariance matrices from subsequent sets of first sensor scan measurements, subsequent measurements being assigned to previous track states and covariance matrices or new track states and covariance matrices;

means for partitioning the initial and subsequent first sensor scan measurements into clusters, each cluster being assigned a number of hypotheses for associating measurements to track states and covariance matrices;

means for propagating existing track states and covariance matrices associated with a first sensor scan to a successive first sensor scan to provide prediction of the location of the next measurement;

means for setting gates about the predicted location for the first sensor;

means for constructing a negative-log-likelihood matrix relating predicted to actual measurement locations for each hypothesis in each cluster for the first sensor;

means for generating directly, non-combinatorially and in real time N-best feasible hypotheses from the negative-log-likelihood matrix for the first sensor;

means for updating the track state vectors and covariance matrices after each subsequent first sensor scan with the associated subsequent measurements of the N-best hypotheses;

means for generating an initial estimate of a target's launch position, launch direction, launch time, and pitchover angle using assembled track data from the first sensor to determine the type of target;

means for comparing observed intensity measurements to intensity values based on database profiles to determine the type of target using data from the first sensor;

means for generating a target launch state vector and state error covariance matrix from the assembled track data from the first sensor;

a second sensor for generating target line-of-sight (LOS) measurements during multiple scans of a target environment;

means for generating initial track state vectors and state error covariance matrices from an initial set of second sensor scan measurements and subsequent track state vectors and state error covariance matrices from subsequent sets of second sensor scan measurements, subsequent measurements being assigned to previous track states and covariance matrices or new track states and covariance matrices;

means for partitioning the initial and subsequent second sensor scan measurements into clusters, each cluster being assigned a number of hypotheses for associating measurements to track states and covariance matrices;

means for propagating existing track states and covariance matrices associated with a second sensor scan to a successive second sensor scan to provide prediction of the location of the next measurement;

means for setting gates about the predicted location for the second sensor;

means for constructing a negative-log-likelihood matrix relating predicted to actual measurement locations for each hypothesis in each cluster for the second sensor;

means for generating directly, non-combinatorially and in real time N-best feasible hypotheses from the negative-log-likelihood matrix for the second sensor;

means for updating the track state vectors and covariance matrices after each subsequent second sensor scan with the associated subsequent measurements of the N-best hypotheses;

means for generating an initial estimate of a target's launch position, launch direction, launch time, and pitchover angle using assembled track data from the second sensor to determine the type of target;

means for comparing observed intensity measurements to intensity values based on database profiles to determine the type of target using data from the second sensor;

means for generating a target launch state vector and state error covariance matrix from the assembled track data from the second sensor; and optimal target data association means for identifying which target launch locations are in a common field of view between the two sensors and comparing a number of the target launch states generated from the assembled track data from the two sensors using state-to-state association to produce a set of optimally matched pairs of target states and error covariance matrices and a set of unmatched target states and covariance matrices.

25. The multitarget tracking system as set forth in claim 24, wherein the optimal target data association means includes:

means for optimally combining the target states and error covariance matrices of each matched pair into one state vector and its associated state error covariance matrix.

26. The multitarget tracking system as set forth in claim 25, and further including:

target state initialization means for initializing an inertial stereo target state vector and state error covariance matrix for the matched targets and an inertial mono target state vector and error covariance matrix for the unmatched targets from either sensor.

27. The multitarget tracking system as set forth in claim 26, and further including:

target state estimator means for recursively updating the target state vector and state error covariance matrix from either stereo or mono line-of-sight data from the assembled target track data.

28. The multitarget tracking system as set forth in claim 24, wherein the sensors are electrooptical sensors.

29. The multitarget tracking system as set forth in claim 28, wherein the sensors are infrared sensors.

30. An N-best feasible hypotheses multitarget tracking method for accurately tracking large numbers of closely spaced objects in a dense target environment in real time, comprising the steps of:

generating initial track state vectors and state error covariance matrices from an initial set of first sensor scan measurements and subsequent track state vectors and state error covariance matrices from subsequent sets of first sensor scan measurements, subsequent measurements being assigned to previous track states and covariance matrices or new track states and covariance matrices;

partitioning the initial and subsequent first sensor scan measurements into clusters, each cluster being assigned a number of hypotheses for associating measurements to track states and covariance matrices;

propagating existing track states and covariance matrices associated with a first sensor scan to a successive first sensor scan to provide prediction of the location of the next measurement;

setting gates about the predicted location for the first sensor;

constructing a negative-log-likelihood matrix relating predicted to actual measurement locations for each hypothesis in each cluster for the first sensor;

generating directly, non-combinatorially and in real time N-best feasible hypotheses from the negative-log-likelihood matrix for the first sensor;

updating the track state vectors and covariance matrices after each subsequent first sensor scan with the associated subsequent measurements of the N-best hypotheses;

generating an initial estimate of a target's launch position, launch direction, launch time, and pitchover angle using assembled track data from the first sensor to determine the type of target;

comparing observed intensity measurements to intensity values based on database profiles to determine the type of target using data from the first sensor;

generating a target launch state vector and state error covariance matrix from the assembled track data from the first sensor;

generating initial track state vectors and state error covariance matrices from an initial set of second sensor scan measurements and subsequent track state vectors and state error covariance matrices from subsequent sets of second sensor scan measurements, subsequent measurements being assigned to previous track states and covariance matrices or new track states and covariance matrices;

partitioning the initial and subsequent second sensor scan measurements into clusters, each cluster being assigned a number of hypotheses for associating measurements to track states and covariance matrices;

propagating existing track states and covariance matrices associated with a second sensor scan to a successive second sensor scan to provide prediction of the location of the next measurement;

setting gates about the predicted location for the second sensor;

constructing a negative-log-likelihood matrix relating predicted to actual measurement locations for each hypothesis in each cluster for the second sensor;

generating directly, non-combinatorially and in real time N-best feasible hypotheses from the negative-log-likelihood matrix for the second sensor;

updating the track state vectors and covariance matrices after each subsequent second sensor scan with the associated subsequent measurements of the N-best hypotheses;

generating an initial estimate of a target's launch position, launch direction, launch time, and pitchover angle using assembled track data from the second sensor to determine the type of target;

comparing observed intensity measurements to intensity values based on database profiles to determine the type of target using data from the second sensor;

generating a target launch state vector and state error covariance matrix from the assembled track data from the second sensor; and identifying which target launch locations are in a common field of view between the two sensors and comparing a number of the target launch states generated from the assembled track data from the two sensors using state-to-state association to produce a set of optimally matched pairs of target states and error covariance matrices and a set of unmatched target states and covariance matrices.

31. The multitarget tracking method as set forth in claim 30, wherein the step of identifying includes the step of:

optimally combining the target states and error covariance matrices of each matched pair into one state vector and its associated state error covariance matrix.

32. The multitarget tracking method as set forth in claim 31, and further including the step of:

initializing an inertial stereo target state vector and state error covariance matrix for the matched targets and an inertial mono target state vector and error covariance matrix for the unmatched targets from either sensor.

33. The multitarget tracking method as set forth in claim 32, and further including the step of:

recursively updating the target state vector and state error covariance matrix from either stereo or mono line-of-sight data from the assembled target track data.

34. The multitarget tracking method as set forth in claim 30, wherein the sensors are electrooptical sensors.

35. The multitarget tracking method as set forth in claim 34, wherein the sensors are infrared sensors.

* * * * *